Figure 1:
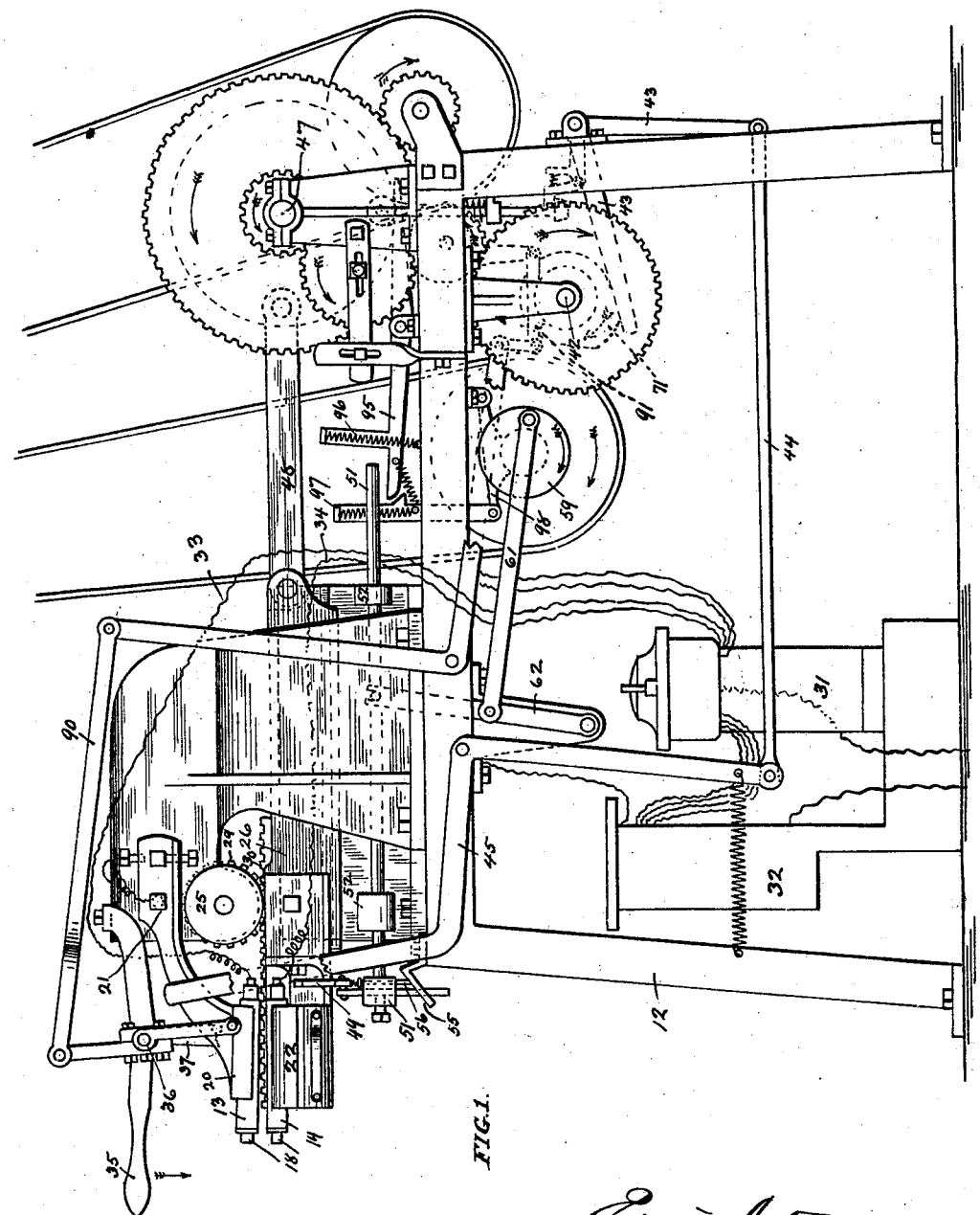

No. 693,803. Patented Feb. 18, 1902.
E. NORTON.
MACHINE FOR SOLDERING OR UNITING SEAMS OF SHEET METAL CANS.
(Application filed Sept. 10, 1900.)
(No Model.) 5 Sheets—Sheet 1.

WITNESSES:
F. B. Townsend
N. W. Munday

INVENTOR.
Edwin Norton
BY Munday, Evarts & Adcock
His ATTORNEYS.

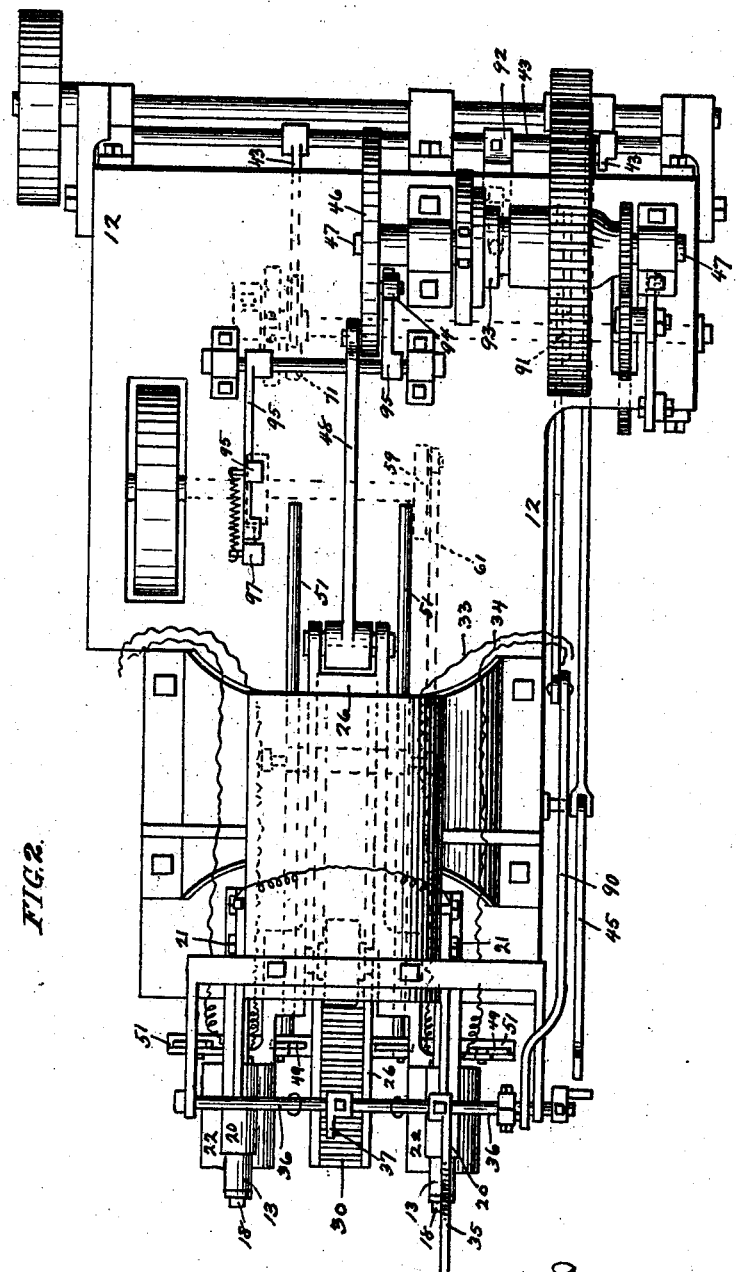

No. 693,803. Patented Feb. 18, 1902.
E. NORTON.
MACHINE FOR SOLDERING OR UNITING SEAMS OF SHEET METAL CANS.
(Application filed Sept. 10, 1900.)
(No Model.) 5 Sheets—Sheet 3.
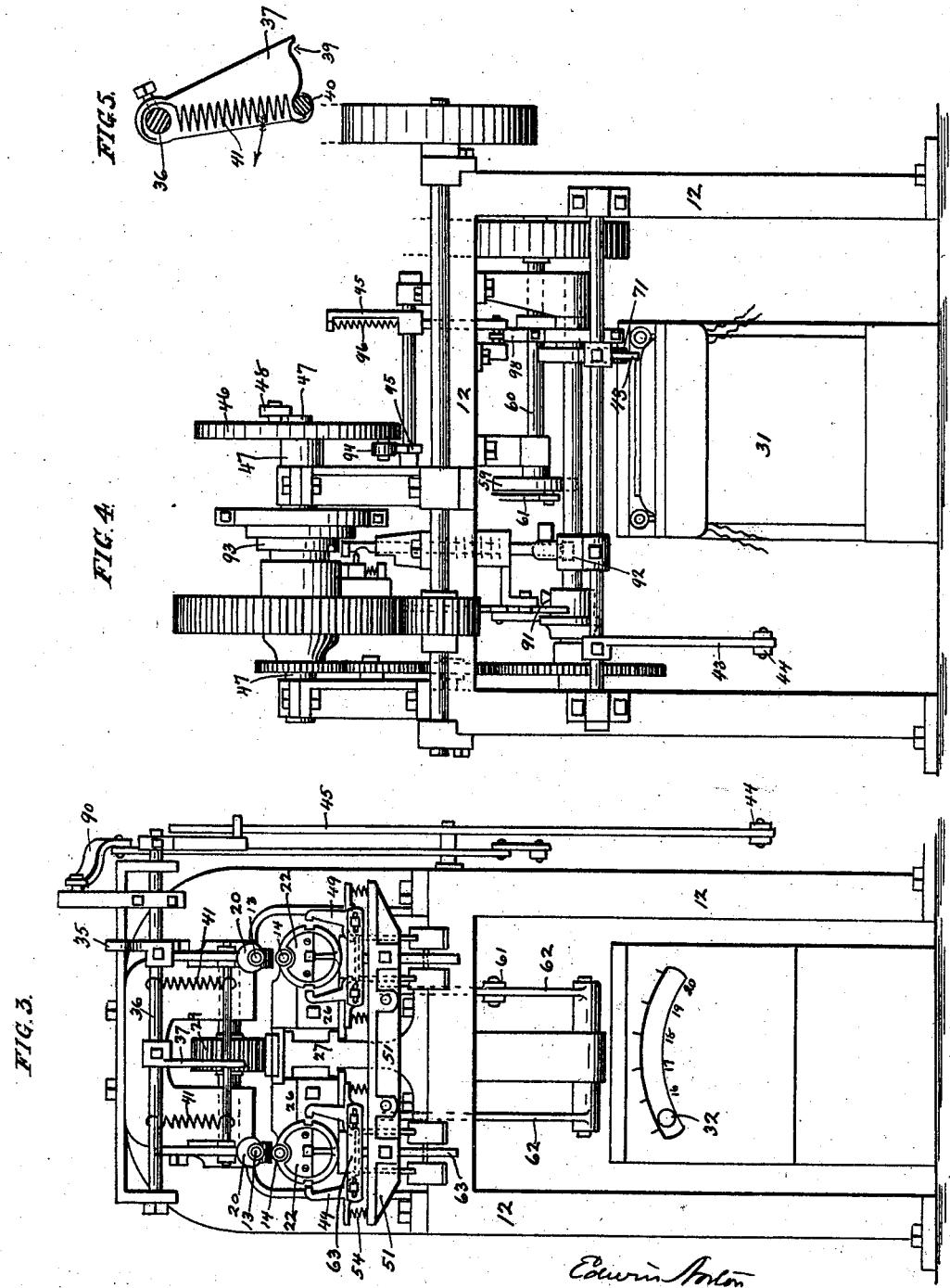
WITNESSES:
F. B. Townsend
INVENTOR.
Edwin Norton
BY Munday, Evarts & Adcock,
His ATTORNEYS.

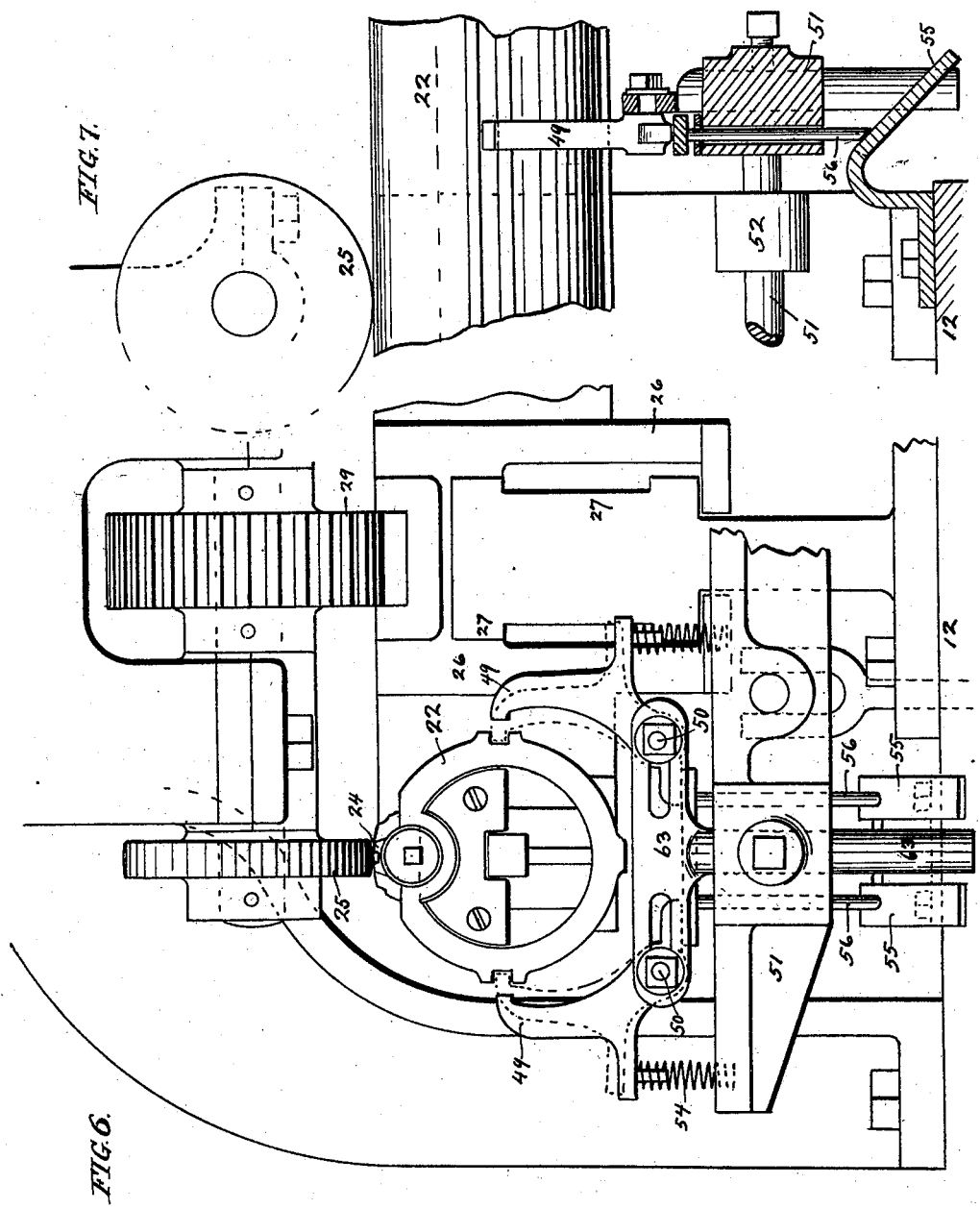
No. 693,803. Patented Feb. 18, 1902.
E. NORTON.
MACHINE FOR SOLDERING OR UNITING SEAMS OF SHEET METAL CANS.
(Application filed Sept. 10, 1900.)
(No Model.) 5 Sheets—Sheet 4.

No. 693,803. Patented Feb. 18, 1902.
E. NORTON.
MACHINE FOR SOLDERING OR UNITING SEAMS OF SHEET METAL CANS.
(Application filed Sept. 10, 1900.)
(No Model.) 5 Sheets—Sheet 5.
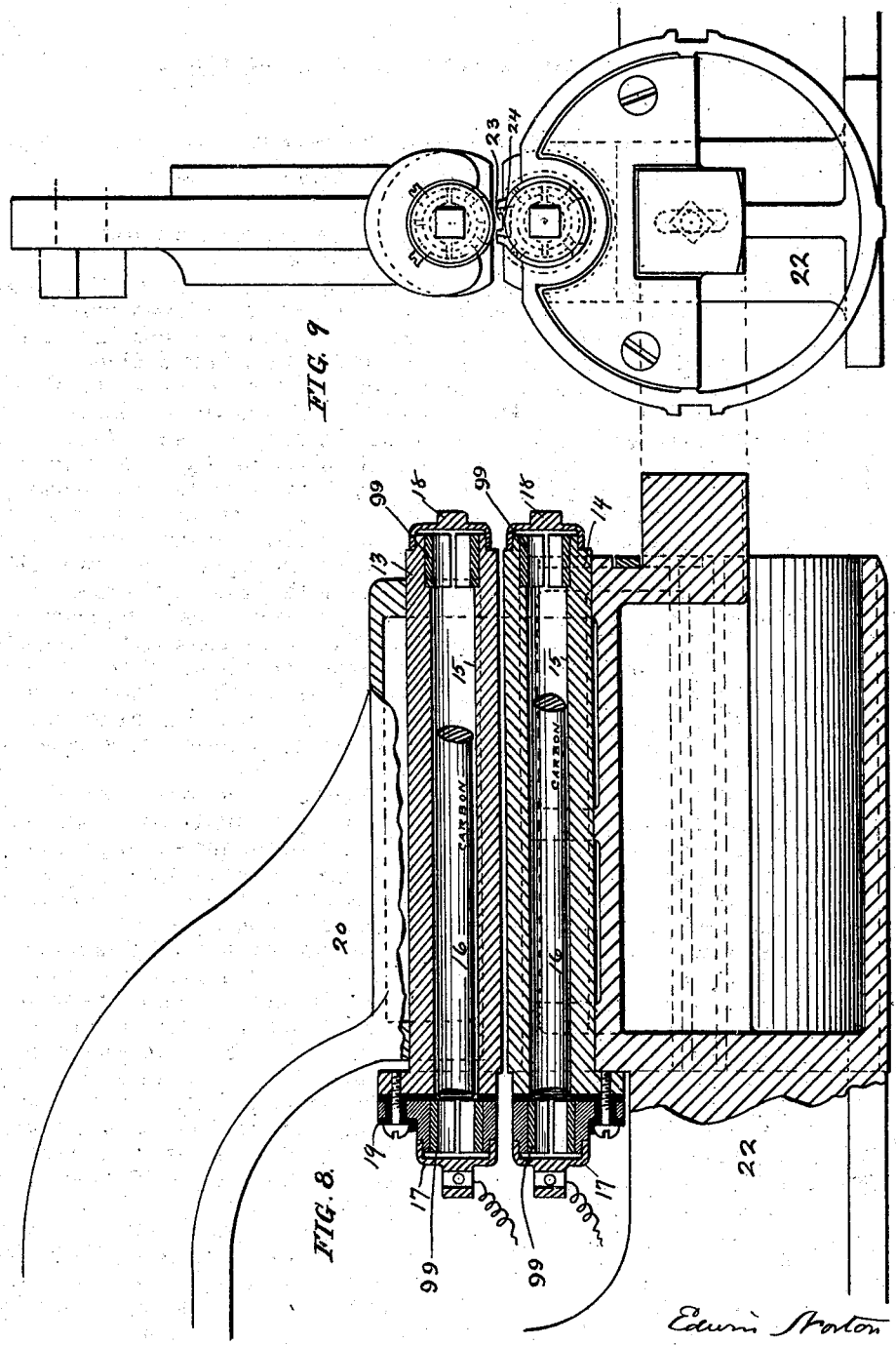
WITNESSES:
F. B. Townsend
INVENTOR.
BY Munday, Evarts & Adcock
His ATTORNEYS.

UNITED STATES PATENT OFFICE.

EDWIN NORTON, OF MAYWOOD, ILLINOIS, ASSIGNOR, BY MESNE ASSIGNMENTS, TO AMERICAN CAN COMPANY, OF JERSEY CITY, NEW JERSEY, A CORPORATION OF NEW JERSEY.

MACHINE FOR SOLDERING OR UNITING SEAMS OF SHEET-METAL CANS.

SPECIFICATION forming part of Letters Patent No. 693,803, dated February 18, 1902.

Application filed September 10, 1900. Serial No. 29,573. (No model.)

*To all whom it may concern:*

Be it known that I, EDWIN NORTON, a citizen of the United States, residing in Maywood, in the county of Cook and State of Illinois, have invented a new and useful Improvement in Machines for Soldering or Uniting Seams of Sheet-Metal Cans, of which the following is a specification.

This invention relates to machines for uniting or soldering the seams of sheet-metal cans; and it relates more particularly to improvements upon the machine shown and described in the pending application of Edwin Norton, Serial No. 720,451, filed June 14, 1899, and in which the seam is formed or soldered without the use of or application thereto of any additional solder by simply fusing the tin or other soft-metal coating of the tin plate and compressing together and uniting the folds or parts of the seam or joint through the agency of the tin or soft-metal coating itself. The machine of this Edwin Norton invention and application results in a material reduction of the cost of the cans, as the solder is saved, and also produces a much better can, as the ordinary solder in use in the manufacture of tin cans contains lead and is more or less objectionable on the inside surface of the seams of the cans in preserving many food products. In the practical operation of machines for soldering cans without the use of additional solder and by simply fusing the tin-coating of tin plate to secure the certainty and reliability of operation necessary to insure absolutely tight, strong, and perfect seams in every instance, so that the cans can safely be relied upon not to develop leaks, it is very important that the upper and lower heater-bars between which the seam of the can is clamped or embraced should always be kept at a uniform and proper degree of heat and the seam exposed thereto a uniform and proper time on each and every can, as too low a degree of heat or too short exposure will cause an imperfect fusion of the tin coating and imperfect union of the parts, while too high a degree of heat or too long exposure is apt to occasion scorching or discoloration of the stock or too much flowing of the fused tin and its escape from the folds of the joint or seam, thus in either case resulting in defective or imperfect work.

My invention consists in the means I employ for practically overcoming the difficulties or objections above indicated, and by means of which I am enabled to rapidly and cheaply solder or unite the side seams of sheet-metal cans without the use of additional solder by simply fusing the tin coating of the tin-plate and by which I am enabled to always form or unite such seams perfectly and with certainty and uniformity—that is to say, it consists, essentially, in the combination, with the upper and lower heater-bars by which the seam is clamped or embraced and the necessary heat imparted thereto to fuse the tin, of electric heaters, preferably consisting of carbon sticks located in the heater-bars, which are made hollow to receive them and by which the heater-bars are maintained at a uniform and proper degree of heat.

It further consists, in combination with these parts, of suitable automatic mechanism for separating or unclamping the heater-bars, and thus rendering uniform the period of time the seam of each can is exposed to the heating or fusing operation.

It further consists in combining with one of the heater-bars, preferably the lower one, a seam-compressing roller, the heater-bar and roller having a reciprocating or traveling movement in respect to each other, so that the parts or folds of the seam may be compressed without disturbing or removing its position from the heater-bar, upon and by which its tin coating has been fused, by which means greater certainty and perfection of the seams are secured.

It further consists in the combination, with the parts above mentioned, of a device for automatically ejecting the can-bodies from the heater-bar after the seams thereof have been soldered, united, or formed.

It further consists in the novel construction of parts and devices and in the novel combinations of parts and devices herein shown and described, and more particularly specified in the claims.

In the accompanying drawings, forming a part of this specification, Figure 1 is a side elevation of a machine embodying the invention. Fig. 2 is a plan view; Fig. 3, a front end view; Fig. 4, a rear end view; Fig. 5, a detail view of a part hereinafter to be described. Fig. 6 is a detail view, in front elevation, showing the can-body ejector or extractor device. Fig. 7 is a detail side elevation, partly in vertical section, showing mechanism for actuating the can-body ejector or extractor jaws or fingers. Fig. 8 is a detail vertical section showing the seam heater-bars and the electric heaters therefor, and Fig. 9 is an enlarged front elevation of the heater-bars and the horns or arms upon which they are mounted.

In the drawings like numerals of reference indicate like parts throughout the several figures.

In the drawings, 12 represents the frame of the machine.

13 is the upper heater-bar, and 14 the lower heater-bar, the machine being preferably furnished with two of each, so that two can-bodies can be operated upon at the same time. Each of the heater-bars 13 14 corresponds in length to the can-body or to the seam to be soldered and consists of a hollow bar of steel or other metal, the hole or chamber 15 therein being slightly larger in diameter than the electric heater 16, preferably a carbon stick, contained therein. In each heater-bar the electric heater or carbon stick 16 is held by metal clamps 99 in the caps 17 and 18, one at each end. The metal cap 17 and its clamp 99 are insulated from the heater-bar by insulation 19, while the other metal cap 18 is in electric contact with the heater-bar, so that the electric current must pass through the electric heaters or carbons 16 from end to end, and thus heat the same and through them the heater-bars 13 14 by radiation. The upper heater-bar 13 is mounted upon or carried by a movable or hinged arm 20, pivoted to the frame at 21, so that it may be moved up and down to clamp or embrace the seam of the can-body between itself and the opposing or lower heater-bar 14 and to release the seam or separate the heater-bars after the proper period of heating has elapsed.

The lower heater-bar 14 is mounted upon or carried by a horn or support 22, having a free outer end and small enough in size for the can-body to pass around it. The lower heater-bar 14 is provided with a longitudinal groove or channel 23 to receive the folds of the side seam or joint of the can-body, and thus keep the seam to be soldered in proper registry with the contacting portions of the heater-bars 13 14, between which it is embraced. The lower heater-bar 14 is also preferably provided with a hardened-steel shoe 24, inserted in the heater-bar and in which the groove or channel 23 is formed. This shoe prevents wear, and thus insures greater certainty and uniformity of operation of the heater-bars clamping or embracing the seam, and also of the seam-compressing roller 25, which coöperates directly with the lower heater-bar and its shoe in compressing firmly and snugly together the folds or parts of the seam after the tin coating thereof has been fused by the heating operation. In this seam-compressing operation the lower heater-bar and the seam-compressing roller have a traveling or reciprocating movement in respect to each other, for which purpose or movement one or the other of these devices—the lower heater-bar or the roller, and preferably the lower heater-bar—is mounted upon a traveling or reciprocating slide 26, adapted to move back and forth on suitable guides 27 on the frame of the machine. As the slide 26 reciprocates, and thus carries the lower heater-bar 14 and its supporting-horn 22 and the can thereon under the roller 25, the folds or parts of the seam or joint to be united are tightly, rigidly, and firmly compressed together. To prevent the roller 25 from slipping on the seam and insure its proper rolling thereon, the shaft 28 of the roller may be and preferably is furnished with a gear 29, which engages a rack 30 on the slide, and thus insures the rotation of the roller.

31 represents an electric-current transformer of any well-known or suitable construction, and 32 a switch device of any well-known or suitable construction, by which devices the electric current may be transformed and regulated in amount as required, so as to produce and maintain uniformly the required or proper degree of heat in the electric heaters or carbons 16 and in the metal heater-bars 13 14, which are heated thereby.

33 34 are the electric-circuit wires leading from the transformer to the metal caps 17, which are in electric connection with the carbons 16, but insulated from the heater-bars 13 14 and from the frame of the machine. The current passes from the transformer, for example, through the wire 33 to the insulated metal cap 17, thence through the carbon 16, electrically connected therewith, to the other metal cap 18 at the opposite end of said carbon and which is not insulated from the frame, thence through the frame to the other uninsulated metal cap 18, thence through the other carbon 16 to the other insulated cap 17, and thence back through the wire 34 to the transformer. As the current required for operation is very low—only a few volts potential—and as the whole frame of the machine is of the same potential, excepting that of the two insulated caps, there is no danger of shock or inconvenience to the workmen in placing the sheet-metal cans in the machine.

The upper or movable heater-bar 13 and its operating-arm 20, upon which it is secured, are operated or depressed to cause the seam to be clamped or embraced between the two heater-bars 13 14, by means of a handle or lever 35, secured to the rock-shaft 36 on the frame, and the same are held in this depressed position for the required length of time by a trigger, clutch, or dog 37, which is automatically tripped or released after the proper interval of heating has elapsed. The dog or trigger 37 is secured to the rock-shaft 36, and when the pair of upper heater-bar hinged arms 20 20 are depressed by the operating-lever 35 the notch 39 on the dog 37 engages a cross-bar 40, connecting the upper heater-bar-carrying arms 20 20, and thus holds the same depressed. The rock-shaft 36 is automatically rocked to release the dog and allow the upper heater-arms to be lifted by the springs 41 after the proper interval of time has elapsed for the heating of the seam by means of a cam 71 on the shaft 42 and suitable connecting levers and links 43 44 45. After the tin coating has been fused by the action of the heater-bars 13 14, the lock or dog 37 released, and the heater-bars thus again separated the slide 26, carrying the lower heater-bar, is automatically carried back and forth under the seam-compression roller 25. The slide 26 may be thus reciprocated by any suitable automatic connecting or operating mechanism, the same consisting, preferably, of a crank-wheel 46 on the shaft 47 and connecting link or pitman 48. After the seam of the can-body has thus been passed back and forth under the seam-compressing roller 25 and has been released from the bite or grasp of said roller it is automatically ejected, extracted, or removed from the lower heater-bar 14 and its supporting-horn 22 by an ejector or extractor device 49, preferably consisting of a pair of hinged movable or pivoted jaws or fingers hinged at 50 to a reciprocating slide or carriage 51, which reciprocates on suitable guides 52 on the frame of the machine. The jaws or fingers 49 engage the rear end of the can-body, fitting in longitudinal grooves 53 at the sides of the horn 22. The jaws or fingers 49 are closed toward each other by springs 54, and they are automatically opened to permit the can-body to be conveniently inserted over the horn by stationary cams 55 on the frame of the machine, which engage vertically-moving pins 56 on the slide 51. The ejector-slide 51 may be automatically reciprocated, as required, by any suitable connecting mechanism, the same consisting, preferably, of a crank-wheel 59 on the shaft 60 and a suitable connecting-link 61 and lever 62. The fingers 49 are adjustably connected to the slide 51 through the adjustable bar 63.

In operation after the can-body is inserted on the horn 22 the handle 35 is depressed, thus clamping the heater-bars together through the dog 37 and operating the lever 90, which operates the clutch 91 and sets shaft 42 to revolving, said shaft carrying the cam 71. When cam 71 makes one revolution, it operates the dog 37 through the lever 43 and connecting parts, and thus separates the heater-bars. At the same time the cam 71, through bent lever or rock-shaft 43 and its arm 72, operates clutch 93 and allows shaft 47 to revolve, and thus reciprocate the slide 26, on which the lower horn 22 is mounted. The roller-pin 94 on the crank-wheel 46 also releases lever-arm 95, so that it is pulled down by spring 96, thus engaging it with the lifting-arm 97, ready to operate the same. When the crank-wheel 46 makes a revolution and returns the horn-slide 26 to its required position, the roller-pin 94 reëngages the lever-arm 95 and raises the lifting-arm 97 and operates the clutch 98, which allows the shaft 60 to revolve and which shaft, through crank-wheel 59, link 61, and lever 62, operates the ejector.

I claim—

1. In a machine for uniting together the parts or folds of a seam or joint of tin-plate, or other sheet metal having a soft fusible metal coating, the combination with a pair of heater-bars between which the parts of the seam to be united may be clamped or embraced, and a pair of electric heaters for heating said bars, whereby the proper extent and degree of heat may be applied for forming perfect joints with certainty and uniformity and without injuring the stock, substantially as specified.

2. The combination of a pair of hollow heater-bars adapted to embrace the parts of a metal seam between them, and a pair of electric heaters or carbons inside said heater-bars, whereby the proper extent and degree of heat may be applied for forming perfect joints with certainty and uniformity and without injuring the stock, substantially as specified.

3. The combination with a pair of hollow heater-bars adapted to embrace the parts of a metal seam between them, a pair of electric heaters or carbons inside said heater-bars, whereby the proper extent and degree of heat may be applied for forming perfect joints with certainty and uniformity and without injuring the stock, and a seam-compressing roller, substantially as specified.

4. The combination with a pair of hollow heater-bars adapted to embrace the parts of a metal seam between them, a pair of electric heaters or carbons inside said heater-bars, a seam-compressing roller, one of said heater-bars and said roller having a reciprocating motion in respect to each other, substantially as specified.

5. The combination with an upper heater-bar mounted on a movable arm, of a lower heater-bar carried by a reciprocating slide, electric heaters inside said heater-bars, and a seam-compressing roller, substantially as specified.

6. The combination with an upper heater-bar mounted on a movable arm, of a lower heater-bar mounted on a horn over which a can-body may be passed, electric heaters inside the heater-bars, means for holding the heater-bars in contact with the seam and means for automatically releasing or separating the heater-bars to secure uniformity of the heating or fusing operation, substantially as specified.

7. The combination with an upper heater-bar mounted on a movable arm, of a lower heater-bar mounted on a horn, means for closing the upper heater-bar upon the seam and automatically releasing or separating the same from contact therewith, substantially as specified.

8. The combination with an upper heater-bar mounted on a movable arm, of a lower heater-bar mounted on a horn, means for closing the upper heater-bar upon the seam and automatically releasing or separating the same from contact therewith, and a seam-compressing roller coöperating with the lower heater-bar, substantially as specified.

9. The combination with an upper heater-bar mounted on a movable arm, of a lower heater-bar mounted on a horn, means for closing the upper heater-bar upon the seam and automatically releasing or separating the same from contact therewith, and electric heaters inside said heater-bars, substantially as specified.

10. The combination with an upper heater-bar mounted on a movable arm, of a lower heater-bar mounted on a horn, means for closing the upper heater-bar upon the seam and automatically releasing or separating the same from contact therewith, electric heaters inside said heater-bars, and a seam-compressing roller coöperating with the lower heater-bar, substantially as specified.

11. The combination with an upper heater-bar mounted on a movable arm, of a lower heater-bar mounted on a horn, means for closing the upper heater-bar upon the seam and automatically releasing or separating the same from contact therewith, electric heaters inside said heater-bars, a seam-compressing roller coöperating with the lower heater-bar, and a can-body ejector or extractor, substantially as specified.

12. The combination with an upper heater-bar mounted on a movable arm, of a lower heater-bar mounted on a horn, and a seam-compressing roller coöperating with the lower heater-bar, substantially as specified.

13. The combination with an upper heater-bar mounted on a movable arm, of a lower heater-bar mounted on a horn, a reciprocating slide carrying the horn, and a seam-compressing roller, substantially as specified.

14. The combination with an upper heater-bar mounted on a movable arm, of a lower heater-bar mounted on a horn, a seam-compressing roller coöperating with the lower heater-bar, and a can-body ejector, substantially as specified.

15. The combination with an upper heater-bar mounted on a movable arm, of a lower heater-bar mounted on a horn, a reciprocating slide carrying the horn, a seam-compressing roller, and a can-body ejector, substantially as specified.

16. The combination with an upper heater-bar mounted on a movable arm, of a lower heater-bar mounted on a horn, a reciprocating slide carrying the horn, a seam-compressing roller, a can-body ejector, and mechanism for automatically operating said parts, substantially as specified.

17. The combination with a pair of heater-bars, of a pair of electric heaters inside said heater-bars, whereby the proper extent and degree of heat may be applied for forming perfect joints with certainty and uniformity and without injuring the stock, and means for compressing the folds or parts of the seam after the tin coating thereof has been fused, substantially as specified.

18. The combination with a pair of heater-bars, of a pair of electric heaters inside said heater-bars, whereby the proper extent and degree of heat may be applied for forming perfect joints with certainty and uniformity and without injuring the stock, means for compressing the folds or parts of the seam after the tin coating thereof has been fused, and a device for automatically ejecting the can-bodies, substantially as specified.

19. The combination with a pair of heater-bars, of a pair of electric heaters inside said bars, and means for automatically releasing or separating the heater-bars, substantially as specified.

20. The combination with a pair of heater-bars, of a pair of electric heaters inside said bars, means for automatically releasing or separating the heater-bars, and a seam-compressing roller, substantially as specified.

21. The combination with a pair of hollow heater-bars, of a pair of electric-heater carbons inside said bars, and metal caps electrically connected to said carbons at each end, one of said caps being insulated from said heater-bar and the other not, substantially as specified.

22. The combination with a pair of hollow heater-bars, electric-heater carbons inside said bars, a seam-compressing roller, and a can-body ejector, means for automatically releasing or separating the upper heater-bar from the lower heater-bar, means for automatically reciprocating the lower heater-bar, and means for automatically operating the can-body ejector, substantially as specified.

23. The combination with a pair of heater-bars adapted to embrace the parts of a metal seam between them, and an electric heater or carbon inside one of said bars, whereby the proper extent and degree of heat may be applied for forming perfect joints with certainty and uniformity and without injuring the stock, substantially as specified.

24. The combination with a pair of heater-bars adapted to embrace the parts of a metal seam between them, and means for automatically releasing or separating the heater-bars to secure uniformity of the heating or fusing operation, substantially as specified.

EDWIN NORTON.

Witnesses:
H. M. MUNDAY,
EDMUND ADCOCK.